United States Patent
Kroon et al.

(10) Patent No.: US 6,637,341 B2
(45) Date of Patent: Oct. 28, 2003

(54) SAFETY DEVICE FOR A FAIRGROUND ATTRACTION

(75) Inventors: Louisito Johannes Eusebio Kroon, Neede (NL); Albert Louisito Phillipus Kroon, Neede (NL)

(73) Assignee: Cobra Beheer B.V., Neede (NL)

( * ) Notice: Subject to any disclaimer, the term of this patent is extended or adjusted under 35 U.S.C. 154(b) by 0 days.

(21) Appl. No.: 10/106,111

(22) Filed: Mar. 27, 2002

(65) Prior Publication Data

US 2003/0024428 A1 Feb. 6, 2003

(30) Foreign Application Priority Data

Mar. 28, 2001 (NL) ............................... 1017724

(51) Int. Cl.[7] ................................................ A63G 7/00
(52) U.S. Cl. .......................................... 104/53; 297/467
(58) Field of Search ............................... 104/53, 55, 56, 104/63; 297/484, 256.15, 464, 467, 476, 487

(56) References Cited

U.S. PATENT DOCUMENTS

| | | | | | |
|---|---|---|---|---|---|
| 2,851,084 | A | * | 9/1958 | Benjetsky | 297/467 |
| 4,700,632 | A | | 10/1987 | Schmutz | 104/63 |
| 4,770,468 | A | * | 9/1988 | Shubin | 297/487 |
| 5,061,012 | A | * | 10/1991 | Parker et al. | 297/467 |
| 5,129,478 | A | * | 7/1992 | Suenaga et al. | 297/487 |
| 5,272,984 | A | | 12/1993 | Bolliger et al. | 104/63 |
| 5,489,212 | A | | 2/1996 | Yoshimoto et al. | 434/55 |
| 5,503,461 | A | * | 4/1996 | Schreier | 297/484 |
| 5,529,382 | A | * | 6/1996 | Burkat | 297/487 |
| 5,549,356 | A | * | 8/1996 | Gray | 297/256.15 |
| 5,779,319 | A | * | 7/1998 | Merrick | 297/484 |
| 5,902,016 | A | * | 5/1999 | Moran et al. | 297/484 |
| 5,979,333 | A | * | 11/1999 | Houben et al. | 104/63 |
| 6,079,781 | A | * | 6/2000 | Tilley | 297/250.1 |
| 6,098,549 | A | * | 8/2000 | Mares | 104/53 |
| 6,269,750 | B1 | * | 8/2001 | Cornwell et al. | 104/53 |
| 6,341,818 | B1 | * | 1/2002 | Verbovszky et al. | 297/219.12 |

FOREIGN PATENT DOCUMENTS

| | | |
|---|---|---|
| DE | 36 29 495 A1 | 3/1987 |
| EP | 0 545 860 A1 | 11/1992 |

* cited by examiner

Primary Examiner—S. Joseph Morano
Assistant Examiner—Lars A. Olson
(74) Attorney, Agent, or Firm—Oliff & Berridge, PLC

(57) ABSTRACT

A safety device for a construction in which a person is able to sit and with which movements can be executed, for example for an attraction for a fairground or an amusement park. The safety device includes a base that can be fixed to the construction, a restraint that at one end is pivotably connected to the base and that can be moved between a lifted-up position such that the person is able to sit down in the construction or to leave the latter, and a safety position in which the person is secured in the construction, and locking means for locking the restraint in the safety position. The locking means has a locking component that is located at the end of the restraint that faces away from the end where the restraint is pivotably mounted.

12 Claims, 3 Drawing Sheets

SAFETY DEVICE FOR A FAIRGROUND ATTRACTION

BACKGROUND OF THE INVENTION

1. Field of Invention

The invention relates to a safety device for a construction in which people are able to sit and with which movements can be executed. Such constructions are used as an attraction for a fairground or amusement park. The safety device usually has a restraint that at one end is pivotably connected to the construction and that can be moved between a lifted-up position such that the person is able to sit down in the construction or to leave the latter, and a safety position in which the person is secured in the construction, as well as locking means for locking the restraint in the safety position. The purpose of such a restraint is to secure the people who are in an attraction in such a way that they are held properly in place, even at the high speeds and acceleration to which they are subjected in such an attraction.

2. Description of Related Art

The known safety device has been satisfactory to date, but the further developments in the field of fairground attractions give rise to more detailed consideration of the safety standards adopted. There is therefore a need for a safety device which has even higher reliability and safety, so that safety is guaranteed even in the case of the recently developed attractions, which can generate an irregular movement pattern and support the person on a saddle.

SUMMARY OF THE INVENTION

Said aim is achieved in that the locking means are at the free end of the restraint, that is to say the end that faces away from the end where the restraint is pivotably mounted.

Positioning the locking means at the free end of the restraint leads to more favourable loading thereof. The locking means themselves also form a better safety device to prevent the person slipping out from under the restraint.

The locking means can be constructed in many different ways. Preferably, the locking means comprise a projection as well as a lock housing having a recess into which the projection can be inserted, as well as retaining means for retaining the projection in the lock housing, wherein either the projection or the lock housing is fixed to the restraint and whichever of these components is not fixed to the restraint can be fixed to the base.

The retaining means can comprise at least one roller that can be rolled along an upward sloping path in the lock housing, which path together with the inserted projection defines a wedge-shaped space which becomes narrower in the direction in which the projection can be moved out of the lock housing. Preferably, the housing has two upward sloping paths which are located opposite one another and are positioned symmetrically with respect to one another, as well as two rollers, each of which is in contact with one of the paths, between which rollers the projection can be accommodated.

When pressure is exerted on the closed restraint, the rollers pinch the projection so that it is firmly held in the lock housing, which benefits passive safety. For unlocking an actuator is used for moving a slider in the direction of insertion of the projection. The rollers are accommodated in this slider. The slider can be moved approximately parallel to the inserted projection, whilst the rollers have some play in the direction transverse to the direction of movement of the slider. For this purpose the slider has two slots, the longitudinal direction of which is oriented transversely to the direction in which the slider slides, in which slots the rollers are accommodated with play.

In order further to increase safety, a safety harness is provided that at one end is joined to the restraint and at the other end is joined to the base. The safety harness comprises two belts which, when the restraint is lowered, come to bear on the shoulders of the person who has occupied the seat in the construction.

The safety harness can be kept in good contact with the person because each belt can be rolled up on a pretensioned reel. A breast piece is provided on both belts, which breast piece is located close to that end of the belts that is fixed to the restraint. The reels are of the self-locking type as is known for car seat belts. Locking is activated in the event of sudden tensile movements.

According to a practical embodiment, the restraint has two tubes running alongside one another, one end of each tube being pivotably mounted and the other end of each tube having a front support running transversely.

BRIEF DESCRIPTION OF THE DRAWINGS

The invention will be explained in more detail below with reference to an illustrative embodiment shown in the figures.

DETAILED DESCRIPTION OF THE PREFERRED EMBODIMENTS

Figure 1:
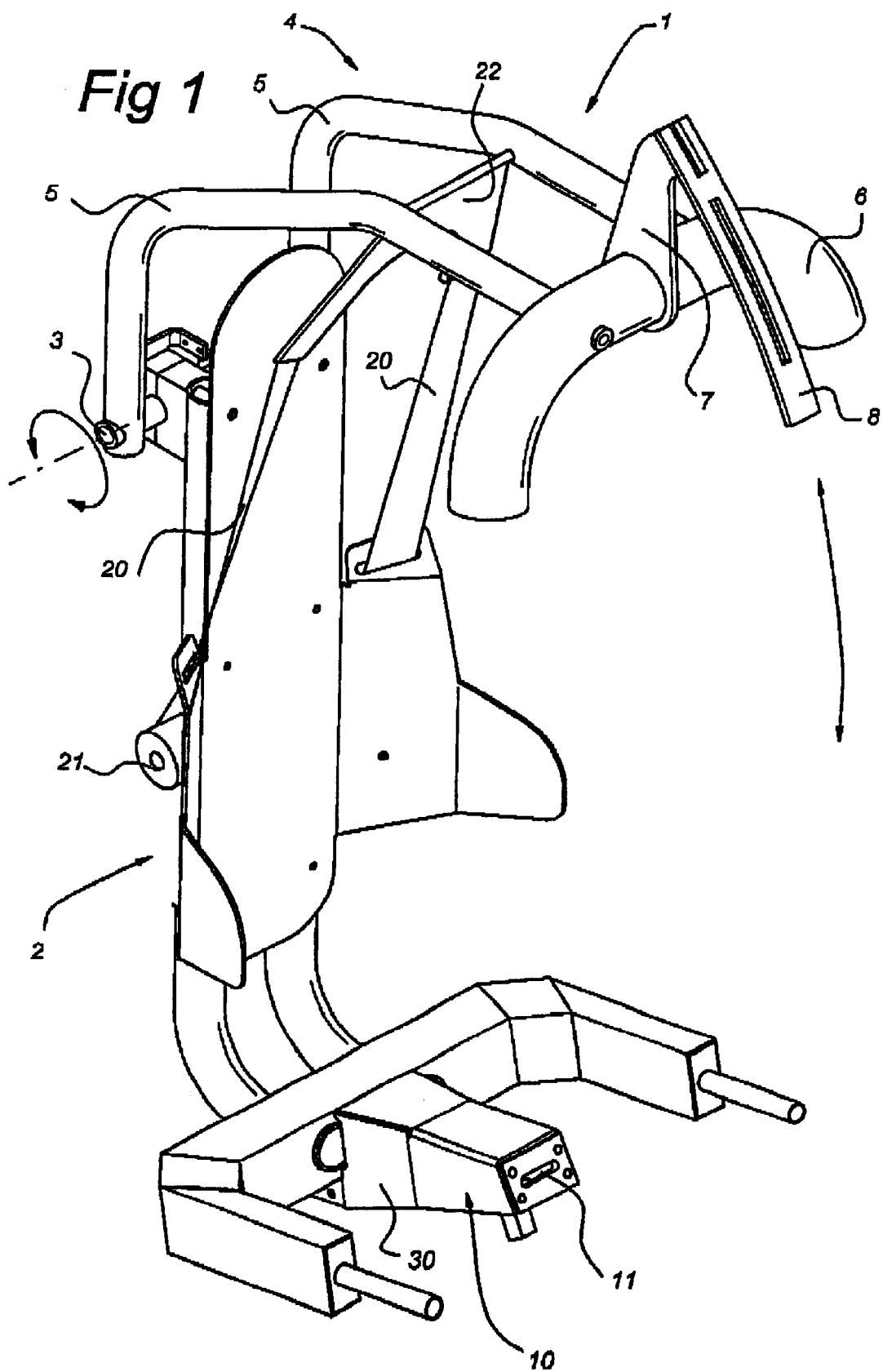
FIG. 1 shows a perspective view of the safety device according to the invention in the open position.

The safety device 1 shown in FIG. 1 is fitted on the skeleton of a saddle-shaped seat 2 that can be fixed to the arms of a fairground attraction. The other features of this fairground attraction are assumed to be known and it will therefore not be described in more detail.

The restraint, that is indicated in its entirety by 4, is mounted at the top of the seat by means of a hinge pin 3. This restraint comprises two curved bars 5, which run more or less parallel and to which a front support 6 is fixed.

A plate-shaped projection 8, that forms part of the locking mechanism 9, is also fixed to the front support 6 by means of a spacer plate 7. The projection 8 is somewhat curved, such that when the restraint 4 is lowered said projection can be accommodated in the lock housing 10, in particular via the opening 11 therein.

Figure 2:
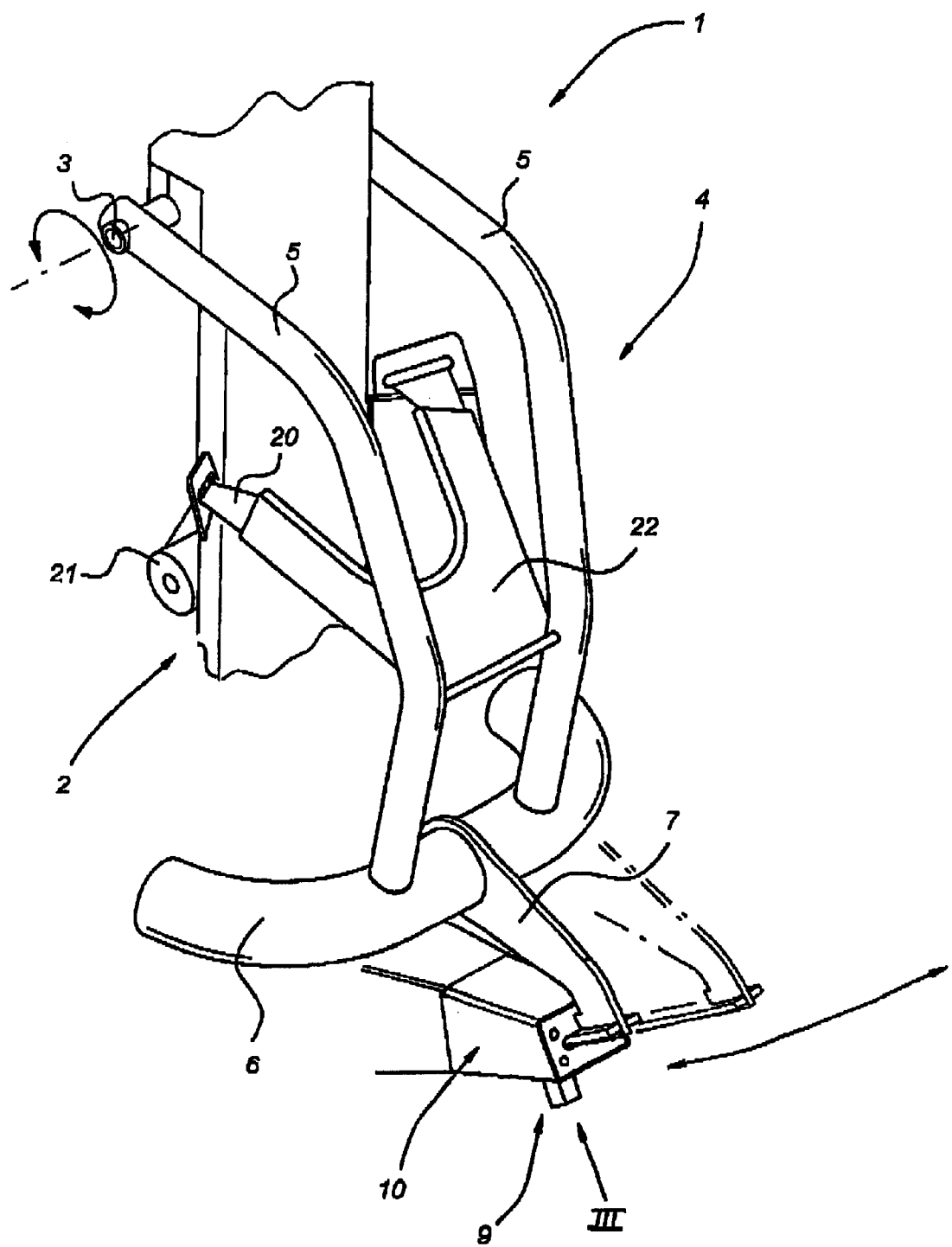
FIG. 2 shows the safety device in the safety position.
Figure 3:
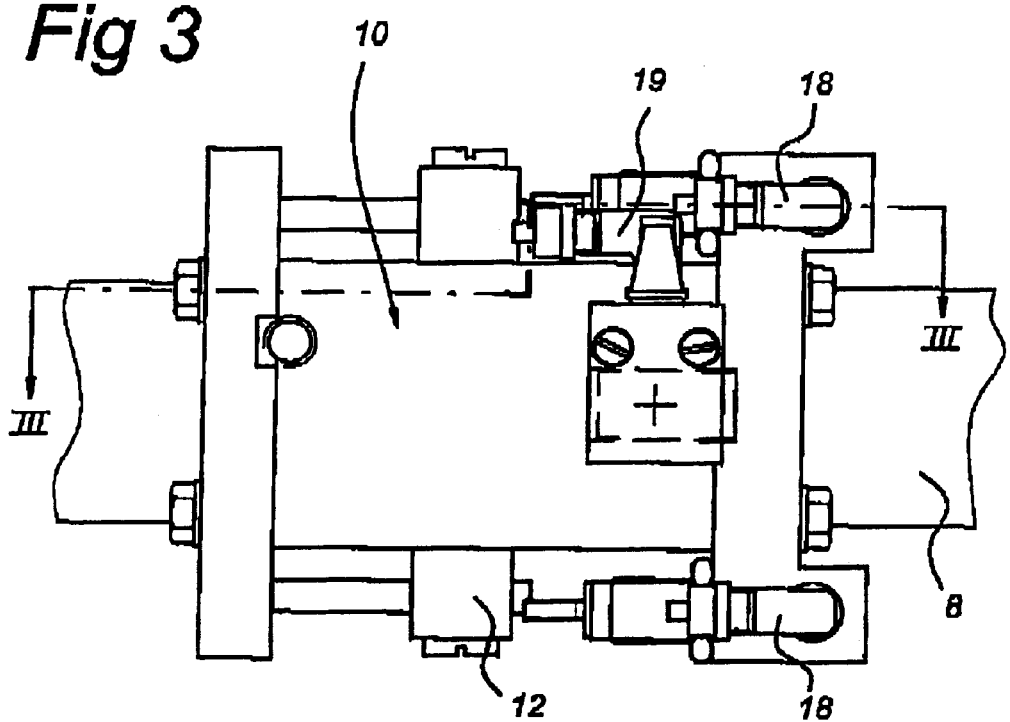
FIGS. 3 and 4 show details of the locking mechanism.

The bottom view of the lock housing 10 indicated by III in FIG. 2 is shown in FIG. 3. The projection 8 is accommodated in the lock housing 10.

Figure 4:
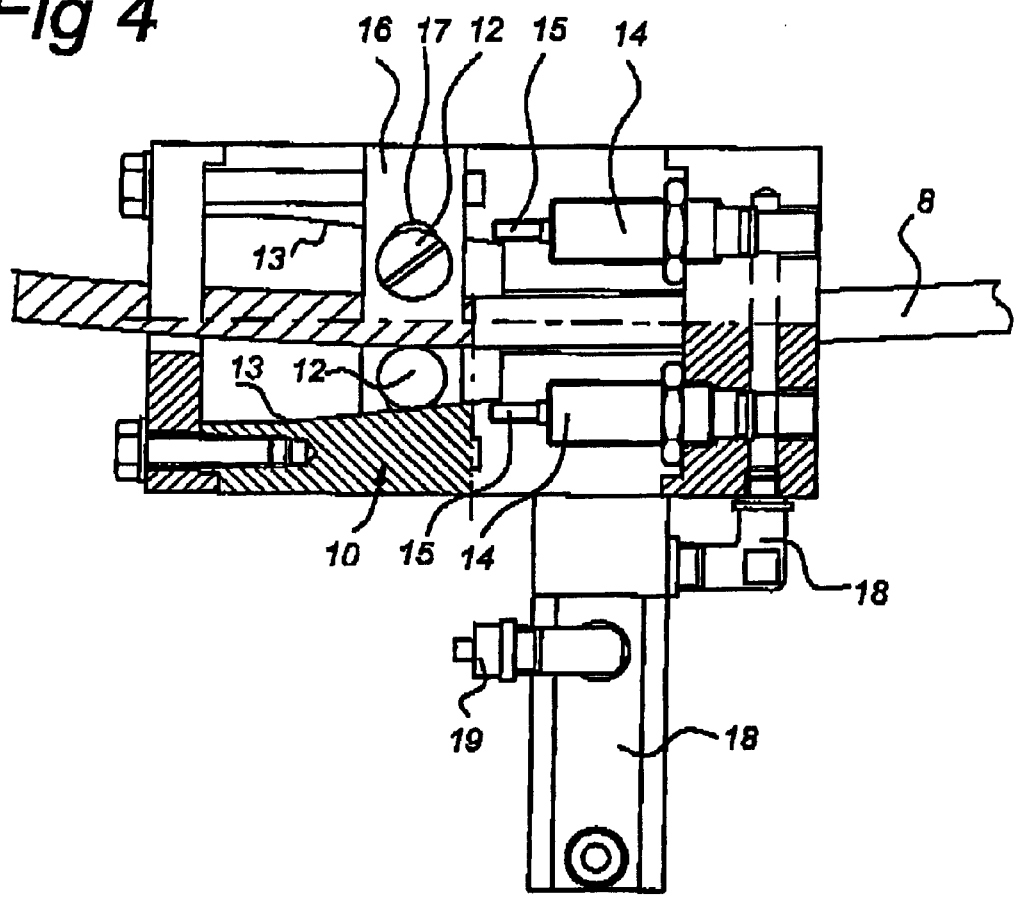

As is shown in the side view, partially in section, in FIG. 4, there are two rollers 12 in the lock housing, which rollers 12 are able to roll along the symmetrically arranged paths 13, which are located opposite one another, in the lock housing 10. These paths 13 become narrower in the direction in which the projection 8 is removed from the lock housing 10. When the projection 8 moves outwards in such a way, the two rollers 12 roll along the projection 8 and the paths 13, as a result of which the projection 8 is pinched firmly from both sides and consequently locked in place.

Pneumatic piston/cylinder devices 14 are fitted in connection with release of the projection 8. When compressed air is supplied, the piston pins 15 of said devices exert backward pressure on the slider 16, in which the rollers 12 are accommodated, as a result of which clamping of the projection 8 is released and said projection can be removed from the lock housing 10.

The rollers are in slots 17 in the slider 16, as a result of which they are able to move apart and towards one another to some extent in connection with clamping or release of the projection 8. The pneumatic piston/cylinder devices 14 can be supplied with compressed air via the lines 18 and the feed 19.

The safety device is furthermore equipped with two belts 20, each of which can be rolled up on predetermined, self-locking reels 21. Locking of the reels 21 is activated as soon as a sudden tensile force is exerted on the belts 20. The belts 20 are provided with a breast piece 22 close to that end thereof that is fixed to the restraint 4, in such a way that even people of smaller stature can be held safely secured in the device.

What is claimed is:

1. A construction for a safety device in which a person is able to sit and with which movements can be executed, comprising:
    a base that can be fixed to the construction;
    a restraint pivotably connected at one end to the base and that can be moved between a lifted-up position such that the person is able to sit down or leave the construction, and a safety position in which the person is secured in the construction; and
    a locking means for locking the restraint in the safety position,
    wherein the locking means has a locking component that is located at an end of the restraint that faces away from the one end where the restraint is pivotably mounted;
    wherein the locking means further comprises:
        a projection;
        a lock housing having a recess into which the projection can be inserted; and
        a retaining means for retaining the projection in the lock housing;
        wherein either the projection or the lock housing is fixed to the restraint and whichever of these components is not fixed to the restraint can be fixed to the base;
        wherein the retaining means comprises at least one roller that can be rolled along an upward sloping path in the lock housing, wherein the upward sloping path together with the projection defines a wedge-shaped space which becomes narrower in the direction in which the projection can be moved out of the lock housing, in which space the roller is present in contact with the path and the projection.

2. The safety device according to claim 1, wherein the lock housing comprises:
    two upward sloping paths which are located opposite one another and are positioned symmetrically with respect to one another; and
    two rollers, each of which is in contact with one of the upward sloping paths, wherein between rollers of the projection can be accommodated.

3. The safety device according to claim 1, wherein each roller is accommodated in a slider that can slide along the path such that the roller can be moved, with restricted play, transversely to a direction in which the slider slides.

4. The safety device according to claim 3, wherein the slider has two slots which are located some distance apart and a longitudinal direction of which is oriented transversely to the direction in which the slider slides,
    wherein at least one of the rollers is accommodated with play in each of said slots.

5. The safety device according to claim 3, wherein at least one actuator is provided for moving the slider in a direction of insertion of the projection.

6. The safety device according to claim 5, wherein the actuator comprises a pneumatic piston/cylinder device.

7. The safety device according to claim 1, wherein a safety harness is provided that is joined at one end to the restraint and joined at the other end to the base.

8. The safety device according to claim 7, wherein the safety harness comprises two belts which, when the restraint is lowered, come to bear on the shoulders of the person who has occupied a seat in the construction.

9. The safety device according to claim 8, wherein the belts can each be rolled up on a pretensioned reel, wherein the pretensioned reel is fixed to the base.

10. The safety device according to claim 8, wherein a breast piece is provided on both belts, wherein the breast piece is located close to that end of the belts that is fixed to the restraint.

11. The safety device according to claim 10, wherein the front support carries a spacer plate on the outside of the front support, to which a locking component of the locking means is fixed to the spacer plate, and the base has a support that protrudes forwards and to which a counterpart of the locking means is fixed.

12. The safety device according to claim 1, wherein the restraint comprises:
    two tubes running alongside one another, wherein one end of each tube is pivotably fixed to the base and the other end of each tubes has a front support running transversely.

* * * * *